United States Patent [19]

Loewenthal

[11] Patent Number: 4,752,916
[45] Date of Patent: Jun. 21, 1988

[54] METHOD AND SYSTEM FOR REMOVING THE EFFECT OF THE SOURCE WAVELET FROM SEISMIC DATA

[76] Inventor: Dan Loewenthal, 2 Simtat Mayan Harod, Ramat Hasharon, Israel

[21] Appl. No.: 889,850

[22] Filed: Jul. 28, 1986

Related U.S. Application Data

[63] Continuation-in-part of Ser. No. 644,947, Aug. 28, 1984, abandoned.

[51] Int. Cl.$^4$ ................................................ G01V 1/38
[52] U.S. Cl. .......................................... 367/24; 367/46
[58] Field of Search ..................... 367/24, 46, 49, 58; 364/421

[56] References Cited

U.S. PATENT DOCUMENTS

| | | | |
|---|---|---|---|
| 2,923,367 | 2/1960 | Cox | 367/58 |
| 3,343,626 | 9/1967 | Sparks | 367/24 |
| 4,380,059 | 4/1983 | Ruehle | 367/46 |
| 4,449,208 | 5/1984 | Moeckel et al. | 367/30 |
| 4,486,865 | 12/1984 | Ruehle | 367/24 |
| 4,520,467 | 5/1985 | Berni | 367/24 |

Primary Examiner—Charles T. Jordan
Assistant Examiner—John W. Eldred
Attorney, Agent, or Firm—Benjamin J. Barish

[57] ABSTRACT

The invention provides a method and system for seismic exploration of a body by applying, to the body acoustic energy producing a source wavelet and detecting the response of the body thereto to produce seismic traces. According to the method, at least two receivers are located within the body to output electrical signals corresponding to (1) the pressure field produced at a particular depth in the body as a result of the application of the acoustic energy, and (2) the pressure gradient produced at the depth in the body as a result of the application of the acoustic energy. The electrical signals are processed to estimate the source wavelet and thereby to deconvolve the detected response producing deghosted and spiked seismic traces. The two receivers may be two pressure sensors located at two different depths below the point of application of the acoustic energy to the body, two particle-velocity sensors located at two different depths below the point of application of the acoustic energy to the body, or a pressure sensor and a particle-velocity sensor both located at the same depth below the point of application of the acoustic energy to the body.

12 Claims, 13 Drawing Sheets

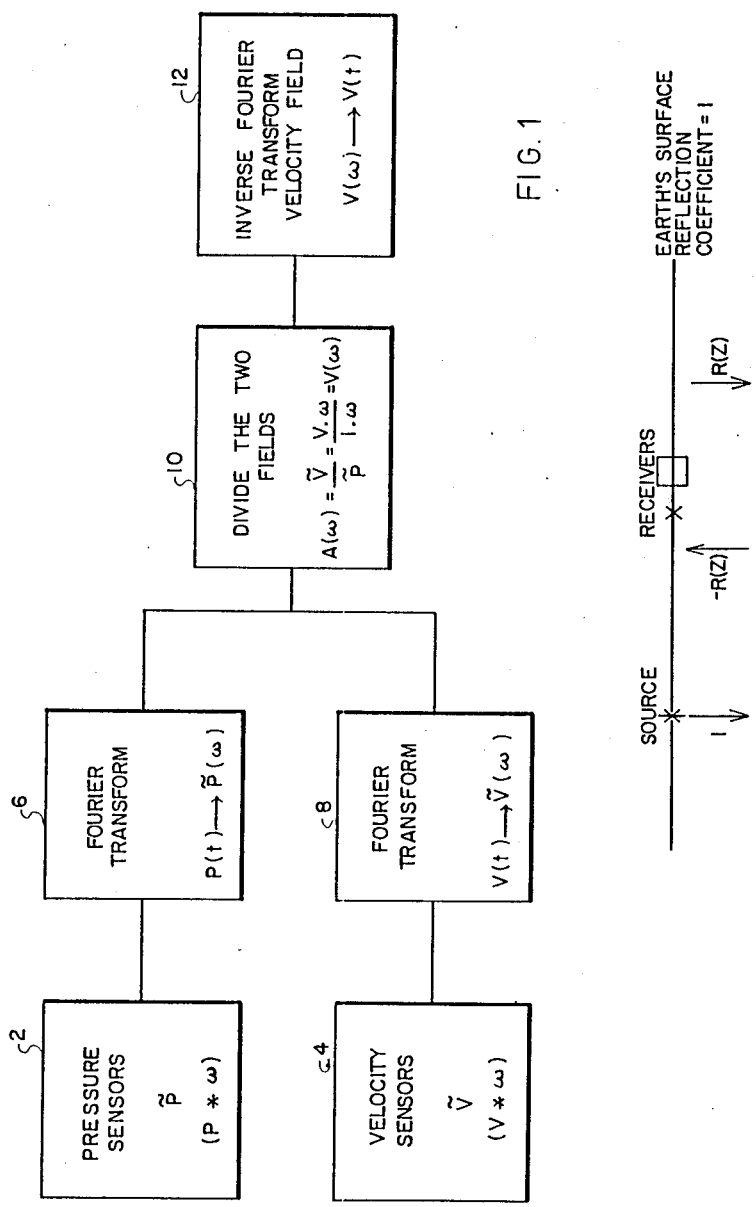

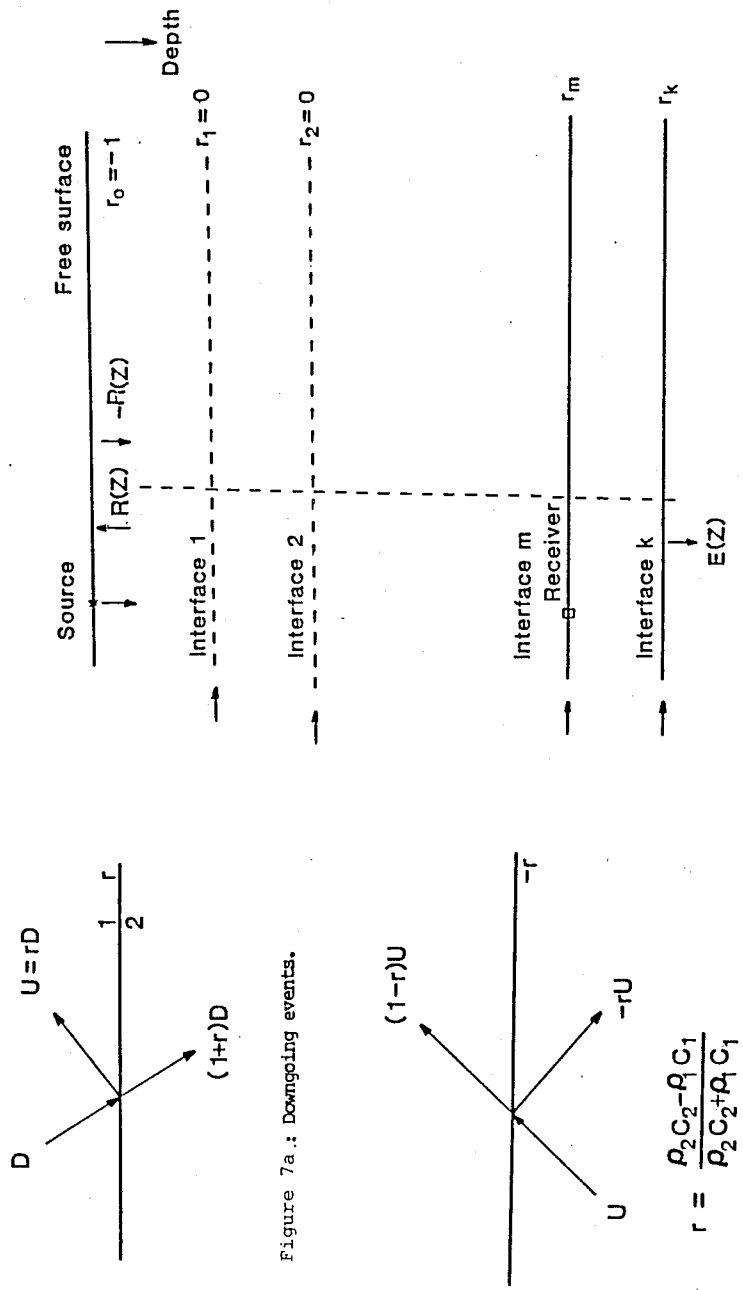

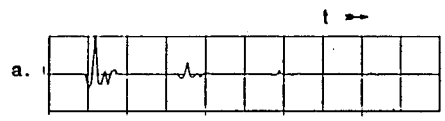

Figure 10a: Pressure field at receiver position LR=13.

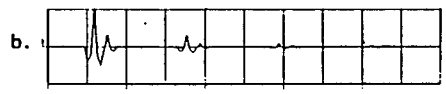

Figure 10b: Particle velocity field at receiver position LR=13.

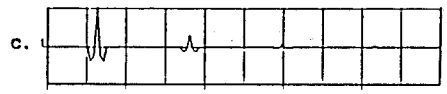

Figure 10c: Downgoing wave at receiver position LR=13.

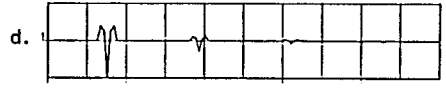

Figure 10d: Upgoing wave at receiver position LR=13.

Figure 10e: Pressure field on the free surface.

Figure 10f: Particle velocity field on the free surface.

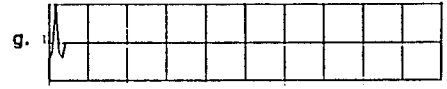

Figure 10g: Estimated wavelet

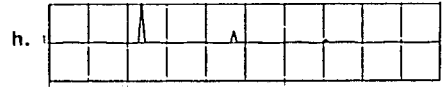

Figure 10h: Estimated reflectivity

Figure 10: Display of traces corresponding to Figure 9.

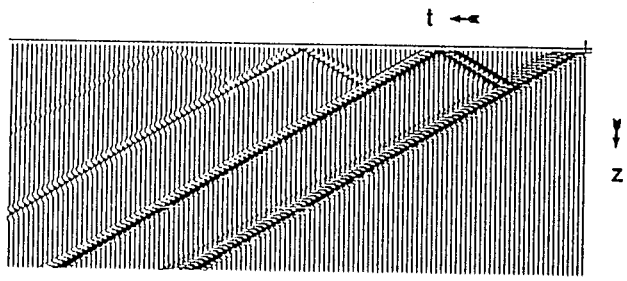
Figure 9a: Pressure field.
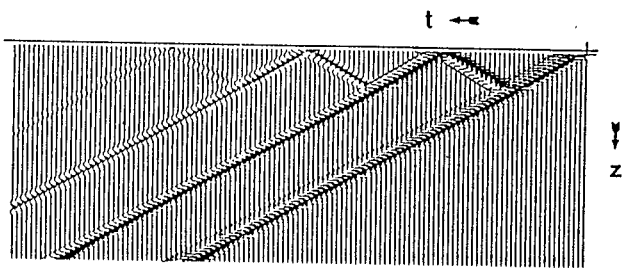
Figure 9b.: Particle velocity field.
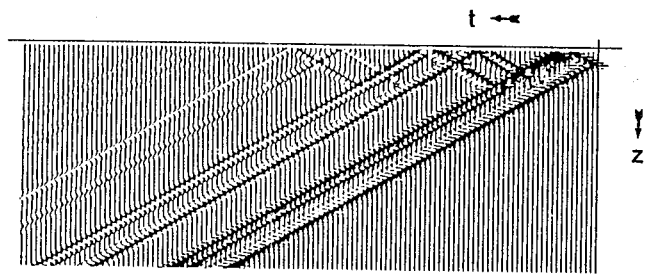
Figure 11a: Pressure field.
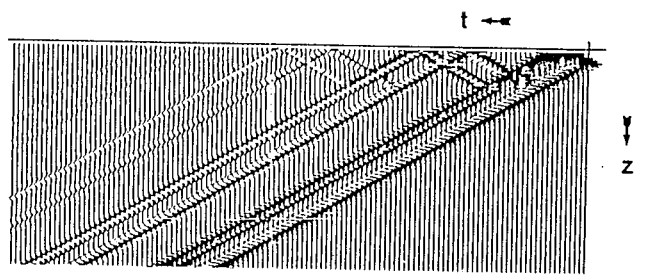
Figure 11b: Particle velocity field.
Figure 11: A synthetic seismogram with source located at depth (LS=5) of a layer over half space model.

t →
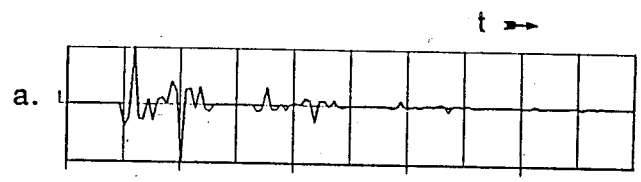
Figure 12a: Pressure field at receiver position LR=13.
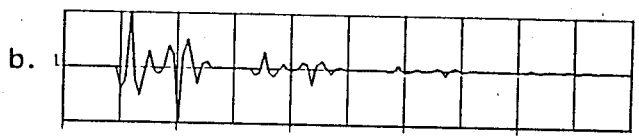
Figure 12b: Particle velocity at receiver position LR=13.
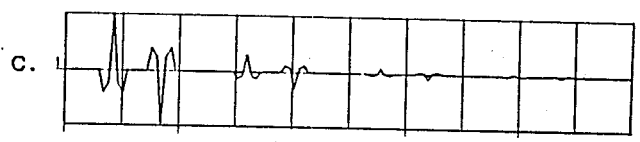
Figure 12c: Downgoing wave at receiver position LR=13.
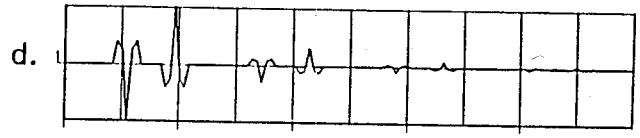
Figure 12d: Upgoing wave at receiver position LR=13.
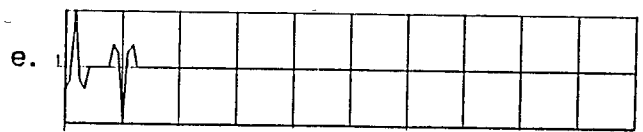
Figure 12e: Estimated source wavelet and ghost.
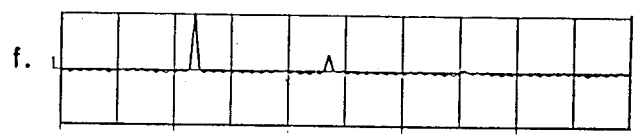
Figure 12f: Estimated reflectivity
Figure 12: Display of traces corresponding to Figure 11.

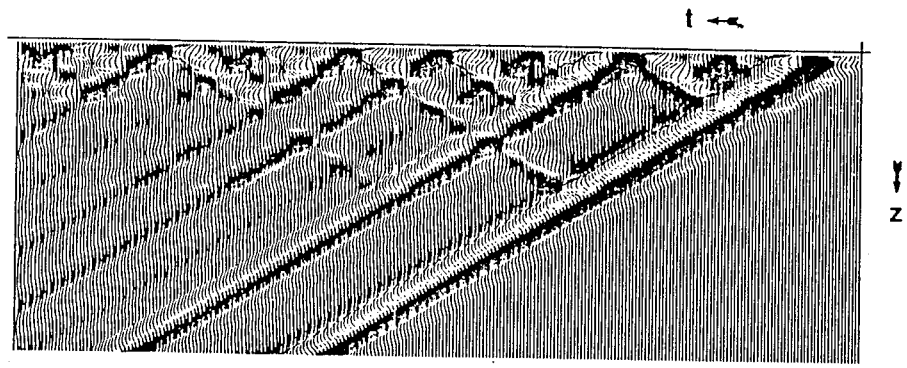
Figure 13a: Pressure field.
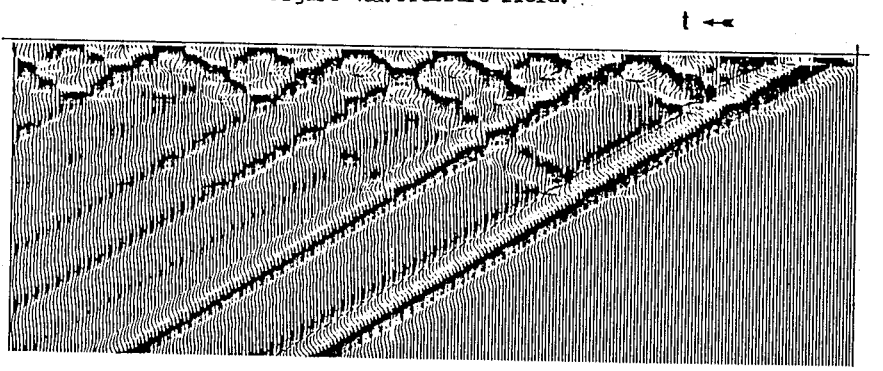
Figure 13b: Particle velocity field.
Figure 13: A synthetic seismogram with source at depth (LS=5) of a multilayered model.

t →
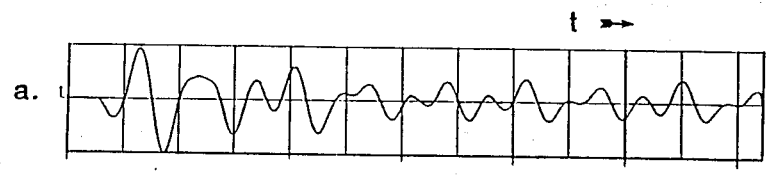
Figure 14a: Pressure field.
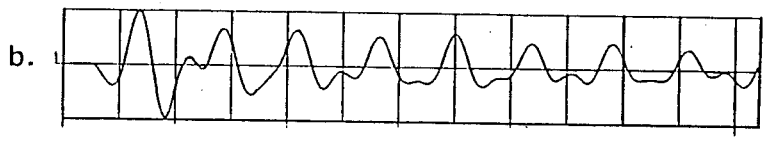
Figure 14b: Particle velocity field.
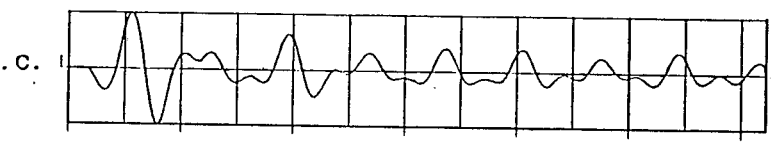
Figure 14c: Downgoing wave.
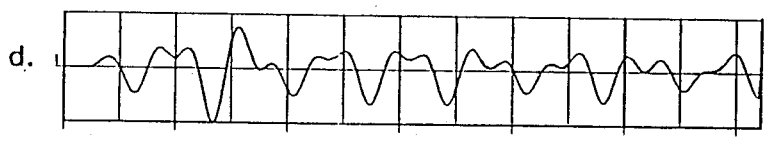
Figure 14d: Upgoing wave.
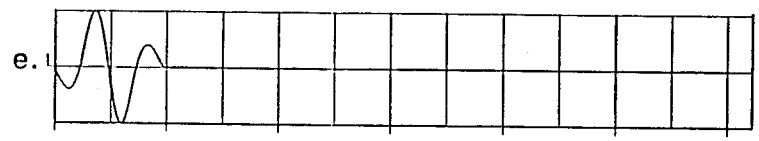
Figure 14e: Estimated source wavelet and ghost.
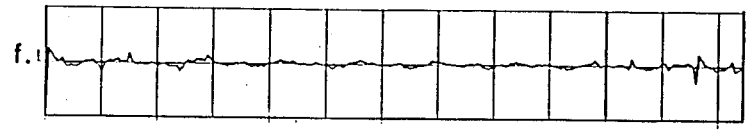
Figure 14f: Estimated reflectivity.
Figure 14: Display of traces correspoding to Figure 13, receiver position located at LR=13.

FIG 17
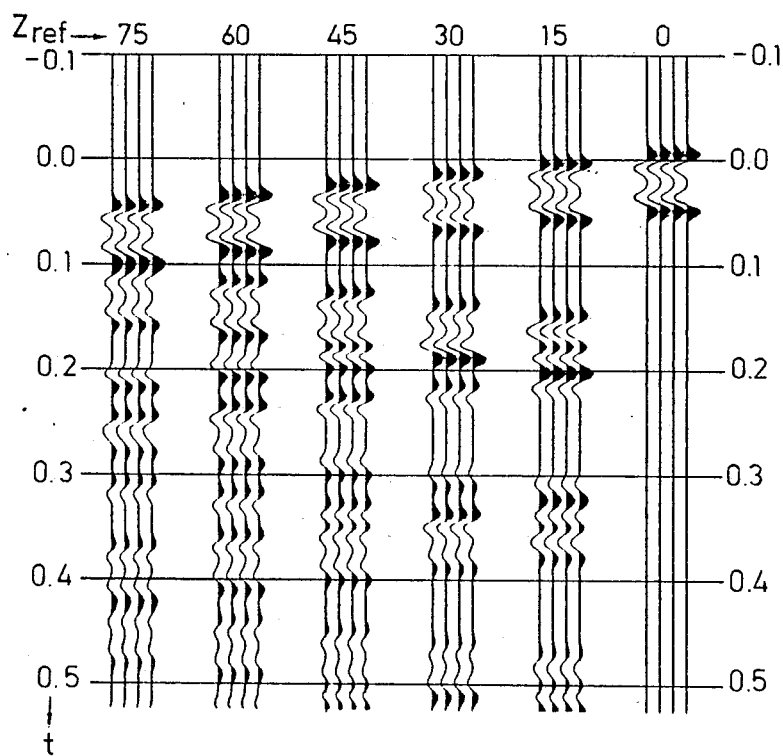
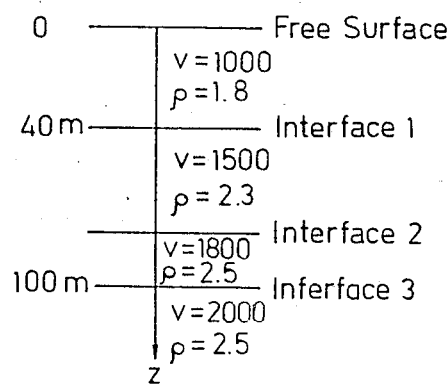
FIG 18

METHOD AND SYSTEM FOR REMOVING THE EFFECT OF THE SOURCE WAVELET FROM SEISMIC DATA

RELATED APPLICATION

The present application is a continuation-in-part of U.S. patent application Ser. No. 06/644,947 filed Aug. 28th, 1984, which application is now abandoned.

BACKGROUND OF THE INVENTION

The present invention relates to seismic exploration, and particularly to a method and system for removing the effect of the source wavelet from seismic data.

The problem of removing the effect of the source wavelet from seismic data continues to be a thriving and controversial topic in the seismic exploration industry. Wavelet deconvolution methods tend to divide into two types: deterministic and statistical. In deterministic deconvolution, the source wavelet to be removed from the data is obtained either from direct measurement or from some model of the source. In statistical deconvolution, the source wavelet is inferred from the data itself by using a statistical model of the earth. Because of the lack of general applicability of the statistical model, many workers find the deterministic approach to be the fundamentally more appealing of the two. The statistical method does, however, offer the possibility of correcting for filtering effects of the earth that are difficult to account for in a deterministic method. Nevertheless, deterministic deconvolution techniques make fewer assumptions and, for the more modest task of correcting for just for source waveform, have a sounder physical basis than do statistical methods.

An object of the present invention is to provide an approach to wavelet deconvolution which, while deterministic in nature, derives its information solely from the data.

BRIEF SUMMARY OF THE INVENTION

According to a broad aspect of the present invention, there is provided a method and system for seismic exploration of a body by applying to the body acoustic energy producing a source wavelet and detecting the response of said body thereto to produce seismic traces; characterized in:

(a) locating at least two receivers within the body below its free surface to output electrical signals representing up-going fields moving upwardly to the free surface, and down-going fields moving downwardly from the free surface, which electrical signals correspond to (1) the pressure field produced at a particular depth in the body as a result of the application of the acoustic energy, and (2) the particle-velocity produced at the depth in the body as a result of the application of the acoustic energy;

(b) recording said electrical signals; and (c) processing the recorded electrical signals to estimate the source wavelet with its full bandwidth spectrum (d) and using said source wavelet with its full bandwidth spectrum to deconvolve the detected response producing deghosted and spiked seismic traces.

The invention may be implemented by utilizing, as the two receivers, two pressure sensors located at two different depths below the point of application of the acoustic energy to the body, two particle-velocity sensors located at two different depths below the point of application of the acoustic energy to the body, or a pressure sensor and a particle-velocity sensor both located at the same depth below the point of application of the acoustic energy to the body.

Thus, as with a previously proposed technique (Ziolkowski, Lerwill, March and Pearson, 1980 Wavelet Deconvolution Using a Source Scaling Law: Geophysical Prospecting, v. 28, p 872–901; and Ziolkowski, 1980, Source Array Scaling for Wavelet Deconvolution: Geophysical Prospecting, v. 28, p 902–918), this technique of the present invention requires additional measurements in the field, but is distinct from that technique in that no scaling law is used; the technique of the present invention also differs in the measurements made and in the method of processing the data. In essence, this technique of the present invention uses the properties of the wave equation to remove the effects of the source. The novel approach is a variation of the deconvolution method developed by Cagniard, 1953, Basic Theory of the Magneto-Telluric Method of Geophysical Prospecting: Geophysics, v. 18, p 605–655, for magneto-telluric studies. In magneto-tellurics, the sources are naturally occurring electro-magnetic fields over which the observer has no control such as, for example, electro-magnetic noise from the ionosphere; the power of that deconvolution process is that any source, even noise, can be deconvolved from the data.

For purposes of example, there are described below three embodiments of the invention, each embodiment including a description of the mathematical analysis on which the respective embodiment is based.

Thus, in the first describing embodiment, the sensed pressure fields are utilized for estimating the source wavelet and for deconvolving the detected response to produce deghosted and spiked seismic traces, by:

(a) sensing the pressure field and pressure gradient field in the time domain;

(b) transforming both fields to the frequency domain;

(c) dividing one of the frequency domain fields by the other to produce a modified function which is equal to the impulse of one of the fields in the frequency domain; and (d) retransforming the modified function back to the time domain to thereby deconvolve the detected response to produce deghosted and spiked seismic traces. Preferably, the two receivers are a pressure sensor and a particle-velocity sensor both located at the same depth below the point of application of the acoustic energy to the body, the receivers sensing both the pressure and particle-velocity fields in the time domain at equally spaced intervals. Also, preferably the particle-velocity field in the frequency domain is divided by the pressure field in the frequency domain to produce a modified admittance function which is equal to the impulse response of the velocity field in the frequency domain. This is preferable because it produces a modified admittance function which is a vector quantity, whereas dividing the pressure field by the particle-velocity field produces a modified impedance function which is not a vector quantity. In the second describing embodiment, the sensed pressure field and pressure gradient are utilized for estimating the source wavelet by shifting the up-going fields upwardly to the free surface of the medium, and shifting the down-going fields also upwardly to the free surface of the medium, to thereby deconvolve the sensed response and to produce deghosted and spiked seismic data. This embodiment, together with the first embodiment, is described with reference to a body of water.

In the third described embodiment, the sensed pressure field and pressure gradient field are utilized for estimating the source wavelet by shifting the recorded electrical signals representing the up-going fields upwardly to the free surface of the body, and shifting the recorded electrical signals representing the down-going fields also upwardly to the free surface of the body, to simulate a fictitious source at the free surface, and deconvolving the simulated fictitious source from the recorded electrical signals to produce deghosted and spiked seismic data. This embodiment is described with reference to both water and land bodies.

BRIEF DESCRIPTION OF THE DRAWINGS

The invention will be better understood by reference to the accompanying drawings, wherein:

FIGS. 1-6 relate to the first embodiment of the invention and the mathematical analysis on which that embodiment is based;

FIGS. 7a-14 relate to the second embodiment of the invention and the mathematical analysis on which that embodiment is based FIGS. 9a, 9b and 11a, 11b being synthetic seismograms with source located at depth (LS=5) of a layer over half space model, FIGS. 10a-10h being displays of traces corresponding to the seismograms of FIGS. 9a-9b, FIGS. 12a-12f being displays of traces corresponding to the seismograms of FIGS. 11a-11b, FIGS. 13a-13b being synthetic seismograms with source at depth (LS=5) of a multi-layered model, and FIGS. 14a-14f being displays of traces corresponding to the seismograms of FIGS. 13a-13b, with receiver position located at LR=13; and FIGS. 15-21 relate to the third embodiment of the invention and the mathematical analysis on which that embodiment is based.

DESCRIPTION OF PREFERRED EMBODIMENTS

Figure 3:
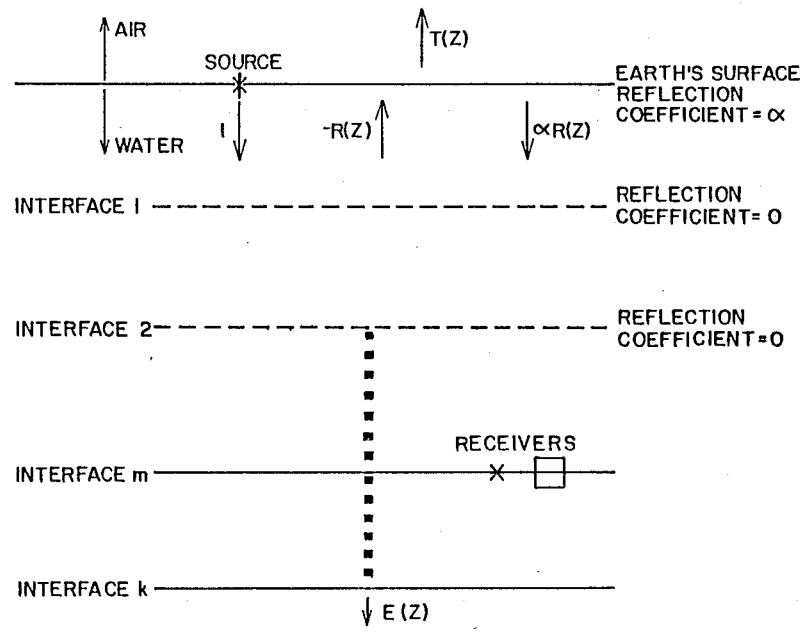

As indicated earlier, all three embodiments of the invention described below relate to a method of seismic exploration of a body by applying acoustic energy to the body (water or land), and detecting the responses of the body to such applied acoustic in the form of seismic traces. In all three described embodiments, two receivers are located within the body to output electrical signals corresponding to (1) the pressure field at a particular depth in the body as a result of the acoustic energy impulse; and (2) the pressure gradient field produced at the same depth. The electrical signals are then processed to estimate the source wavelet, and thereby to deconvolve the detected responses to produce deghosted and spiked seismic traces.

In all three described embodiments, the two receivers may be two pressure sensors, or two particle-velocity sensors, located at two different depths below the point of application of the acoustic energy to the body, or may be a pressure sensor and a particle-velocity sensor both located at the same depth below the point of application of the acoustic energy to the body.

The three embodiments of the invention described below are directed to the manner of processing the electrical signals to estimate the source wavelet and thereby to deconvolve the detected responses to produce deghosted and spiked seismic traces.

The First Embodiment (FIGS. 1-6)

In the first described embodiment, as illustrated in FIGS. 1-6, the sensed pressure field and pressure gradient are utilized for estimating the source wavelet and for deconvolving the detected response to produce deghosted and spiked seismic traces, by: (a) sensing said pressure field and pressure gradient field in the time domain; (b) transforming both fields to the frequency domain; (c) dividing one frequency domain field by the other to produce a modified function which is equal to the impulse of one of the fields in the frequency domain; and (d) retransforming the modified function back to the time domain to thereby deconvolve the detected response to produce deghosted and spiked seismic traces.

The above procedure is illustrated in the block diagram of FIG. 1.

Our starting point is the acoustic wave equation. As is well-known, the wave equation is a linear second-order partial differential equation which, therefore, has associated with its solution two fields that are continuous in both space and time. In seismic experiments, the fields of interst are the pressure field, p, and the particle-velocity vield, v (note that in general the velocity field is a vector). Both these fields independently satisfy the wave equation, which in the space-frequency domain is given by $$\nabla^2 P + \frac{\omega^2}{c^2} P = 0 \qquad (1)$$

and $$\nabla^2 \underline{V} + \frac{\omega^2}{c^2} \underline{V} = 0, \qquad (2)$$

where c is the acoustic velocity, $$P(\underline{x},\omega) = \frac{1}{\sqrt{2\pi}} \int_{-\infty}^{\infty} p(\underline{x},t) e^{-i\omega t} dt, \qquad (3)$$

and $$\underline{V}(\underline{x},\omega) = \frac{1}{\sqrt{2\pi}} \int_{-\infty}^{\infty} \underline{v}(\underline{x},t) e^{-i\omega t} dt. \qquad (4)$$

The pressure and velocity fields are related to each other by both Newton's law $$\nabla P = i\omega\rho\underline{V}, \qquad (5)$$

where $\rho$ is the density of the medium, and by Hooke's law $$\nabla \cdot \underline{V} = \frac{i\omega}{K} P, \qquad (6)$$

where K is the bulk modulus of the medium. The acoustic wave equation follows from eqns (5) and (6) provided that it is assumed that the gradient of $\rho$ is small. In this case the acoustic velocity is $$c^2 = \frac{K}{\rho}. \qquad (7)$$

We now define P and $\underline{V}$ to be the responses of the earth to a pressure field impulse. Also, let us define the convolved fields $\tilde{p}$ and $\underline{\tilde{V}}$, $$\tilde{P} = PW(\omega) \tag{8}$$

and $$\underline{\tilde{V}} = \underline{V}W(\omega), \tag{9}$$

where $W(\omega)$ is any function of frequency alone; hereafter $W(\omega)$ will be used to denote the complex spectrum of the source wavelet. It can be seen that the new fields, P and $\underline{V}$, still satisfy the wave equation [eqns (1) and (2)]. Also, since $W(\omega)$ is space-independent, then the convolution is independent of the location of any measurement of that field. This conclusion implies that the wavelet associated with the pressure field will necessarily be the same as that associated with the velocity field. That is, from Newton's law [eqn (5)], since $W(\omega)$ is space-independent, we have $$\nabla \tilde{P} = W(\omega)\nabla P \tag{10}$$
$$= W(\omega)i\omega\rho V \tag{11}$$
$$= i\omega\rho\underline{\tilde{V}}, \tag{12}$$

with $\underline{V}$ given by eqn (9). A similar result follows from Hooke's law [eqn (6)]; hence the same result holds for velocity field sources.

The novel method of source wavelet deconvolution exploits the fact that the wavelet convolved with the pressure field is the same as that convolved with the velocity field. Let us define a vector, $\underline{A}$, as the scaled ratio of the measured velocity field to pressure field at a point, $$\underline{A} = \underline{V}/YP, \tag{13}$$

where Y is the admittance of the medium in which the measurements are made. Note that eqn (13) requires that v and p be measured for all time so that $\underline{V}$ and P can be obtained from eqns (3) and (4). Because, by eqn (13), the source spectra cancel out, $\underline{A}$ is a source-independent quantity and is thus implicitly always deconvolved. This result is entirely analogous to that in magnetotelluric studies where the ratio of electric and magnetic fields is always deconvolved (Cagniard, 1953, supra). We refer to $\underline{A}$ as the "modified admittance function" or simply the "admittance"; this quantity should not be confused with the local admittance of a medium, which describes the instantaneous ratio of $\underline{v}$ and p. The new method of deconvolution removes the effects of the source by constructing the modified admittance function from measured velocity and pressure fields.

The modified admittance does not satisfy the wave equation, but rather satisfies an equation of the Ricatti form:

$$\nabla \cdot \underline{A} = \frac{i\omega}{K} - i\omega\rho A^2. \tag{14}$$

In order to use the above-described novel approach as a means of deconvolution it is necessary to return from the admittance function to deconvolved pressure and velocity fields so that conventional processing and interpretation schemes can proceed thereafter. The nature of the Ricatti equation indicates that, in general, this is not a simple task. The primary objective in this discussion is to show how the inversion can be accomplished in some simple situations. These studies will also assist in clarifying characteristics of the admittance deconvolution technique as well as possible pitfalls.

Model Case I (FIG. 2)

The features that characterize our first model illustration are
 (1) Vertically incident plane-wave sources.
 (2) Sources and receivers located at the earth's surface.
 (3) Measurement of both pressure and velocity fields.
 (4) The earth's surface as a free boundary with a reflection coefficient of $-1$.
 (5) A horizontally stratified earth.

With assumptions of plane-wave sources and a layered earth, offset is not an issue in this model. In this and subsequent discussions of model cases we adopt the formalism and notations of Claerbout (1976). To begin with, consider an impulsive source at the surface, generated at time $t=0$. The total wavefield can be described in terms of upgoing and downgoing waves, which we denote by U and D respectively. In terms of the upgoing and downgoing waves, the pressure field at any point is given by $$P = D + U, \tag{15}$$

while the velocity field is given by $$V = (D - U)Y. \tag{16}$$

Because this model is only one dimensional, the vector symbol will be omitted from the velocity here and in other appropriate equations. We will make extensive use of Z expansions to describe simultaneously both time series and their spectra (see Claerbout, 1976).

If at time zero we initiate a unit pressure impulse at the surface and commence measuring the wavefields, then at later times observed reflections returning from the earth can be described by a Z expansion, R(Z). These reflections are in turn reflected back into the earth at the free surface and return with opposite polarity. The experimental situation is thus as shown in FIG. 2. The total pressure, given by eqn (15), is thus given by the initial spike at zero time plus the sum of the reflection series and its surface reflection:

$$P = 1 + R(Z) - R(Z) \tag{17}$$
$$= 1 \tag{18}$$
$$\tilde{P} = W \cdot 1 = W \tag{18a}$$

Similarly, from eqn (16), the total velocity field is $$V = 1 + 2R(Z)Y. \tag{19}$$

Thus the pressure field measures only the spike due to the source while the velocity field measures the spike plus twice the (desired) reflection series. Clearly, if the source had some wavelet associated with it, then the pressure-detecting receivers would measure only the source wavelet while the velocity field would be proportional to the impulse response convolved with that wavelet (i.e. $\tilde{V} = V \cdot W$). Deconvolution would then proceed as in conventional deterministic deconvolution by spectral (frequency domain) division of the wavelet into the velocity field in the frequency domain. This is entirely equivalent to calculating the modified admittance function for this model case. Thus knowing the pressure and velocity fields will in addition provide the source wavelet.

In fact, as shown below, a much more powerful result holds for all our model cases: knowledge of any two of the quantities $\bar{P}$, $\bar{V}$ and W is sufficient to determine the third. This Model Case 1 is illustrated in FIG. 2.

Model Case II (FIG. 3)

Let us now begin to generalize the simple model of the last section. We first remove the restriction that the earth's surface be a free boundary and allow a transmitted wave, T(Z), to pass through it by associating a reflection coefficient of $-\alpha$ with the surface; we assume that $\alpha$ is known. Following prior investigators who considered similar types of models, we assume that deep in the earth, corresponding to the latest times recorded, waves escape from the k-th layer without ever again being reflected back; these waves are denoted by E(Z). We also assume that all the layers are separated by equal traveltimes, $\tau$, although more general models can be constructed by considering a large number of thin, equal traveltime layers and then "switching off" appropriate layers by placing their reflection coefficients equal to zero. In keeping with Claerbout, the quantity Z in our expressions will be given by $$Z = e^{2i\omega\tau}, \quad (20)$$

corresponding to the two-way traveltime in any layer. Finally, we will place the receivers on the bottom of the m-th layer and assume that the first m−1 layers are identical (we have in mind the case of receivers at a fixed depth in water) and hence have reflection coefficients of zero at intermediate interfaces. The model is shown in FIG. 3.

For the model in Figure, the pressure and velocity fields measured at layer m, $P_m$ and $V_m$, are given by $$P_m = D_m + U_m \quad (21)$$

$$= \sqrt{Z^m}[D_o + Z^{-m}U_o] \quad (22)$$

and $$V_m = (D_m - U_m)Y \quad (23)$$

$$= Y\sqrt{Z^m}[D_o - Z^{-m}U_o] \quad (24)$$

where $D_o$ and $U_o$ are the downgoing and upgoing waves at the surface. Thus $$P_m = \sqrt{Z^m}[1 + R(Z)(\alpha - Z^{-m})] \quad (25)$$

and $$V_m = Y\sqrt{Z^m}[1 + R(Z)(\alpha + Z^{-m})] \quad (26)$$

The measured admittance is thus $$A_m = \frac{1 + R(Z)(\alpha + Z^{-m})}{1 + R(Z)(\alpha - Z^{-m})}. \quad (27)$$

Eqns (25), (26) and (27) illustrate that the measured admittance is not the same as either the (deconvolved) pressure or velocity fields in this case. However, the admittance can be used to obtain R(Z) and thereby generate the required pressure and velocity fields. From our assumption of a finite number of layers, R(Z) can be approximated by finite length polynomial and hence is determined if $P_m$ and $V_m$ are measured for a sufficiently long period of time. It is interesting to note that (1) the admittance removes any irrelevant time delay common to both $P_m$ and $V_m$, and (2) from R(Z) the pressure and velocity fields can be generated for any receiver location in the first (homogeneous) part of the model, even on the surface of the earth. This second model also bears out our previous assertion that knowledge of two of $\bar{P}$, $\bar{V}$ and W determines the remaining quantity; from two measurements, R(Z) is completely determined and can be used to calculate the remaining information.

Figure 4:
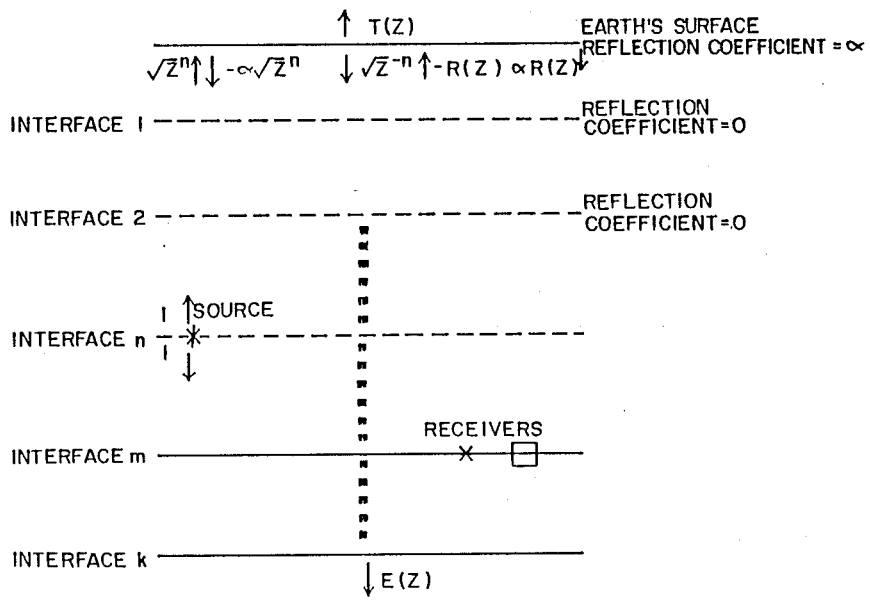

Model Case III (FIG. 4)

In our final model we remove the restriction that the source be at the surface. This generalization will introduce additional up and downgoing waves, through the phenomenon of ghosting; consequently the resulting expressions will not reduce to those previously obtained unless the additional wave components are removed. For convenience we will continue to describe the reflected waves, R(Z), in terms of those that would be measured if the receivers were located at the earth's surface. We will place the source on the bottom of the n-th layer and assume that the n−1 layers above it are identical. This boundary can be either coincidental with, above, or below that on which the receivers are located. The model is shown in FIG. 4. At the earth's surface the source now appears to be an upgoing spike together with the reflected ghost of amplitude $-\alpha$ at time $n\tau$. In addition, a correct description of the source requires a downgoing spike at time $-n\tau$. This acausal wave will be a complicating factor in our results since it will only be observed if the receivers are level with or below the source.

Evaluating the total upgoing and downgoing components at the surface gives $$U_o = \sqrt{Z^n} - R(Z) \quad (28)$$

$$D_o = \sqrt{Z^{-n}} - \alpha\sqrt{Z^n} + \alpha R(Z); \quad (29)$$

hence, from eqns (22) and (24), $$P_m = \sqrt{Z^m}[\sqrt{Z^{-n}} + (\sqrt{Z^n} - R(Z))(Z^{-m} - \alpha)] \quad (30)$$

and $$V_m = Y\sqrt{Z^m}[\sqrt{Z^{-n}} + (R(Z) - \sqrt{Z^n})(Z^{-m} + \alpha)] \quad (31)$$

The measured admittance is thus $$A_m = \frac{\sqrt{Z^{-n}} + (R(Z) - \sqrt{Z^n})(\alpha + Z^{-m})}{\sqrt{Z^{-n}} + (R(Z) - \sqrt{Z^n})(\alpha - Z^{-m})}. \quad (32)$$

Eqn (32) describes the measured admittance for the model shown in FIG. 4. As we have noted, it will be possible to measure $A_m$ only if m > n since only then do eqns (30) and (31) describe causal time series. However, if the downgoing component of the source is not measured, the deconvolution cannot be performed since the measured ratio would be $$A_m{}^I = \frac{(\alpha + Z^{-m})}{(\alpha - Z^{-m})} \quad (33)$$

Eqn (33) contains no information on R(Z) and therefore cannot be used to generate P and V via eqns (30) and (31). It is therefore essential that at least one of the receivers be below or level with the source in order to obtain deconvolved pressure and velocity fields.

Although our emphasis up to this point has been on the measurement of both P and V and their conversion through the modified admittance function into deconvolved reflection series, it is now appropriate to mention an extension of our results. Since the measurement of both the pressure and velocity fields requires the use of two distinct types of receivers, it is of interest to see if only one type of receiver will suffice. That this can be done is already implicit in our results. In fact, by positioning receivers of one kind only at two different depths and constructing the ratio of the measured fields in the frequency domain, a further deconvolved quantity can be defined. For example, in our present model, measurement of the pressure field at two depths, $m\tau$ and $q\tau$ time units from the surface, would yield a quantity $\Phi$ given by $$\Phi = \frac{P_m}{P_q} \quad (34)$$

$$= \frac{\sqrt{Z^m} \, [\sqrt{Z^{-n}} + (R(Z) - \sqrt{Z^n})(\alpha - Z^{-n})]}{\sqrt{Z^q} \, [\sqrt{Z^{-n}} + (R(Z) - \sqrt{Z^n})(\alpha - Z^{-q})]} \quad (35)$$

This result can be used to generate reflection series R(Z) from the measurements, and hence P, V and W can be found (provided that at least one receiver is below the source). This second approach is similar to measuring $\partial P/\partial z$ directly; hence it is no surprise that two such measurements of P can be used to yield information that is equivalent to that contained in the admittance. A similar argument applies to measurements made with two velocity receivers at different depths. It would likewise be possible to vary the source depth and carry out two separate experiments with one receiver provided that the source is depth-independent and consistently repeatable. This latter approach, however, is less attractive because sources are in general depth-dependent and also because it would be ncessary to tie the start times from the two separate experiments.

One advantage of using ratios of pressure fields, as in eqn (35), is that the same type of detector would be used for the two measurements; thus the impulse response of the measuring instrument should be the same and no instrument corrections need be made. A similar advantage of recording the same type of field at two depths is that the admittance, Y, of the medium containing the detectors need not be known. The only requirement is that both detectors be in the same medium (i.e., the same layer). In the general approach where both $\underline{V}$ and P are measured, an error in Y is equivalent to a calibration error associated with one of the detectors. Marine surveying poses no problem since the admittance of water is known and reasonably independent of depth.

Limitations of the Method

Having described the essential features of this new technique, now to be discussed are its limitations. The most general model considered has the following characteristics:

1. Normal incident plane-wave sources.
2. Arbitrary source and receiver locations within the upper layer of the earth (typically a water layer).
3. Measurement of both pressure and velocity fields or measurement of the pressure or velocity field at two depths.
4. The earth's surface as the edge of a half-space with known reflection coefficient $-\alpha$.
5. A one-dimensional earth of arbitrary structure.
6. The validity of the acoustic wave equation as a description of waves in the earth.

Consider each of these assumptions in turn.

The first assumption of normal incident plane-wave sources, which is valid for magnetotelluric studies, but not for seismic studies, is perhaps the most troublesome in the present context of signature deconvolution. Sources used in practice act more like point sources than plane-waves; therefore they are omnidirectional and their departing waves have an amplitude decay proportional to the inverse of the distance they have travelled. Plane-waves do not decay, except through energy partitioning at acoustic-impedance boundaries. One can envisage synthesis of plane-waves by superposition of waves from many point sources distributed over a large area on the earth's surface. This is, however, an impractical and undesirable way in which to have to combine data traces. On the other hand, our observation that ratios of fields are deconvolved quantities (of *some* type) applies in general, independent of the nature of the source; only the model used to interpret these ratios needs to be worked out.

The amplitude decay for point sources can be considered to be a time-dependent modification of the amplitudes in the expressions that have been derived for our one-dimensional model studies. This decay, we may note, is the same as that for a point source with no signature and merely modifies the strength of the reflected signals from layers in a depth-dependent manner. A possible solution to the amplitude decay problem would be to apply a "geometric spreading correction" to the data prior to the deconvolution. If this were done, one can imagine that care must be taken that the correction applied is appropriate; an incorrect application may untowardly distort the spectra of the fields and deteriorate the results of the deconvolution process. Unfortunately, in complex velocity structures, no simple geometric spreading function can correct all components of the recorded wavefield. In particular, in vertically inhomogeneous media a geometric spreading correction, even when it treats primary reflections exactly, will not treat multiple reflections correctly. In addition, the source wavelets themselves are distorted in any geometric spreading correction. It should be noted, however, that the spherical spreading issue is also present in statistical deconvolution techniques; in this respect the admittance method of deconvolution may thus be no more adversely affected than are statistical methods.

When point sources are considered, the assumption of arbitrary source and receiver positions also needs to be reconsidered. Specifically, at finite offsets, wave components that do not travel in a vertical direction then become important. Although the theory then begins to break down, the effect may not be too significant provided that the direct arrival and ghost travel times can be suitably modified and provided that the amplitude decay of the source signal can be accounted for. Another problem that arises is the need to dynamically adjust α to account for the time-variant change of reflection angle at the earth's surface. Furthermore, it is important to have accurate values for the appropriate delay times for use in the invention calculations and, since R(Z) will change for different locations of the receivers, our admittance value will be strictly valid only for nearly coincident pressure and velocity detectors. This sensitivity to relative time may cause problems with the deconvolution method based on the measurement of fields at two different depths; however, the sensitivity may not be significant for small lateral offsets. As an aside, it may be noted that complex values of reflection coefficients for large incidence angles pose no problem and can be incorporated naturally into R(Z).

Another problem with finite offsets would be in the use of spatially extended source arrays, for which angular variations in the source wavelet would result. The angular variation would cause a depth-dependent change in apparent source signature because the wavelet would then be space-dependent and $\bar{P}$ and $\tilde{V}$ would no longer be simply related to their impulse responses. This problem also occurs in conventional deterministic deconvolution where it is usually assumed that the effect is negligible. The admittance approach would derive an average source signature from the data and therefore at least partially allow for spatial variations of array signatures.

One possible method of overcoming both the effects of amplitude decay and finite source-receiver offsets for point sources may be to use the plane-wave decomposition technique [Miller (1971), Direct Inversion of Seismic Observations: Zeit. für Geophysics, v. 37, p. 225-235. In this method the normal-incidence plane wave would be obtained by synthesis of traces measured over a large range of offsets. The resulting data would then be analysed as described above and used to produce an estimate of the source signature wavelet, which would then be used in conventional signature deconvolution. Because of the relative novelty of plane-wave decomposition processing, it is too early to speculate whether or not this technique would overcome the listed shortcomings of our method of signature removal.

The measurement of both pressure and velocity fields requires that velocity-sensitive receivers be used together with conventional hydrophones. The key requirement here is that the two devices be well calibrated. This technology is presently available but its use can be avoided by making pressure measurements at differing depths.

The assumptions that the earth's surface is a (one-dimensional) boundary of a half-space with known reflection coefficient should cause few problems, particularly in a marine environment. Problems may occur, however, in the land environment where uneven topography and weathering may be present. Since our emphasis is on marine data, we will not consider this question further.

The derivation of the expressions for the admittance in all of our three models has relied heavily on the assumption of a one-dimensional earth. Again, this assumption is not necessary in order to obtain an admittance value that does not depend on the source; some assumption about the structural model is necessary, however, for the subsequent interpretation of the admittance, which is required for derivation of the pressure and velocity fields. At present the method is limited to a one-dimensional earth, although the structure of the earth may be otherwise quite general within this assumption. If any dips are present in the structure, then the waves in the upper (water) layer may no longer be purely upgoing and downgoing and the theory breaks down, the problem being similar to that for finite offsets. For small dips, however, the theory may be adequate.

The final assumption, that the acoustic wave equation is an accurate description of waves in the earth, needs perhaps more consideration than it is usually given, despite the fact that it is implicit in all deconvolution techniques. The first point that needs to be borne in mind is that the acoustic wave equation is only the first of a series of increasingly complicated wave equations which, provided that the laws of physics implied in Newton's and Hooke's laws hold, give increasingly more precise descriptions of true wave behaviour in the earth. Because the velocity of the waves is time-independent, expression (for all those wave equations) in the frequency domain enables separation of the fields into impulse responses and source signatures, as we have already described. The major differences that must then be considered involve the nature of the upgoing and downgoing waves; this is an interesting subject that goes well beyond our present concern. For our purposes we may assume with fairly clear conscience the seismic response of the earth to be described by acoustic waves. One particular aspect of the behaviour of waves in the earth, however, must trouble any physicist seeking to model the earth with wave equations. It is well known that seismic waves return with increasingly reduced bandwidth the deeper they penetrate the earth. This phenomenon is usually attributed both to absorption losses within the earth and to the presence of intra-bed multiples. If the loss of high frequencies is indeed due to energy absorption (not to be confused with energy escape), then the acoustic wave equation cannot be a valid way of describing seismic energy since the scattering operator contained within it is unitary and therefore does not allow energy losses (see for example Taylor, 1972). One solution to this problem is to assume the validity of the wave equation at the local level and to model the source wavelet as being time-dependent with increasingly less high frequency content with time. Statistical deconvolution can achieve this by treating seismic traces in windows and assuming the absorption effect to be minimum phase. This windowing is one advantage of statistical deconvolution techniques that cannot be paralleled in deterministic approaches. On the other hand, it may be more appropriate to view the energy losses as intrinsic to R(Z) and consider the results of a full-bandwidth deconvolution as containing information on both the structure and energy-loss qualities of the layers together.

DETAILED DESCRIPTION OF THE FIGS. 5, 6 EMBODIMENT

Figure 5A:
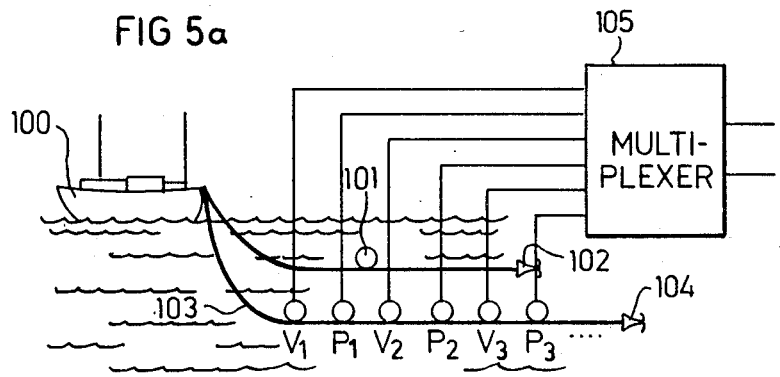
Figure 5B:
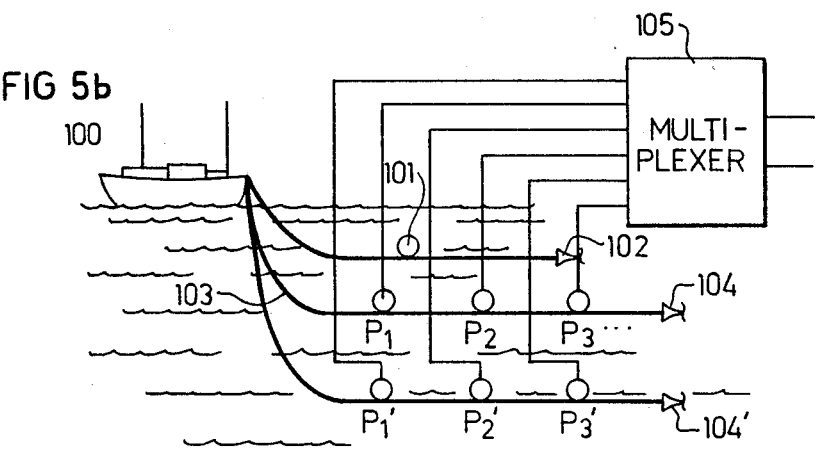
Figure 5C:
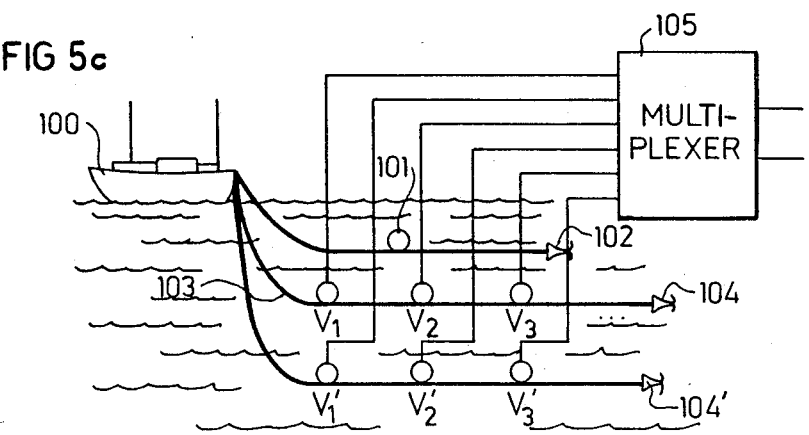
Figure 6:
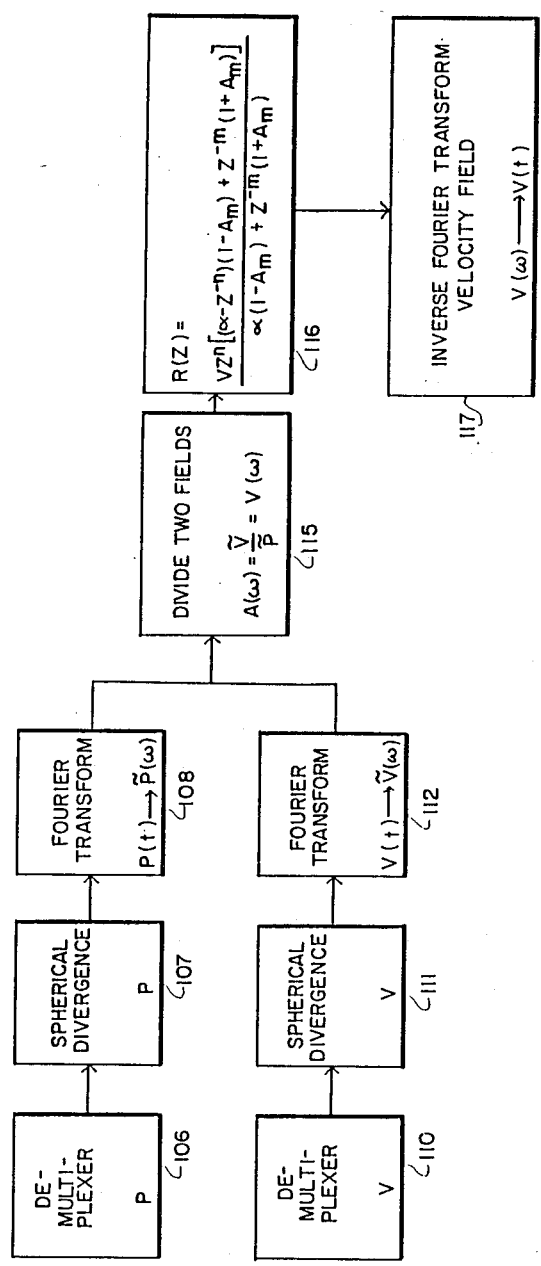
Figure 15:
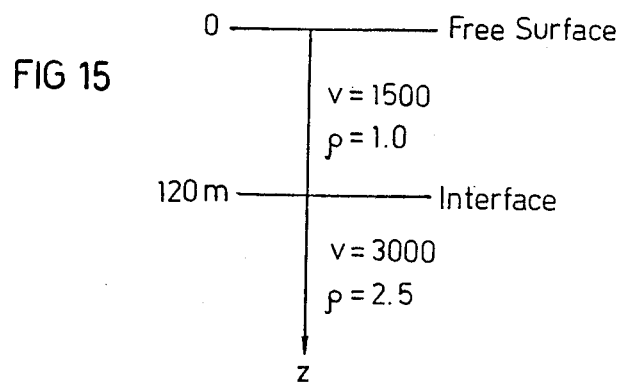
Figure 16:
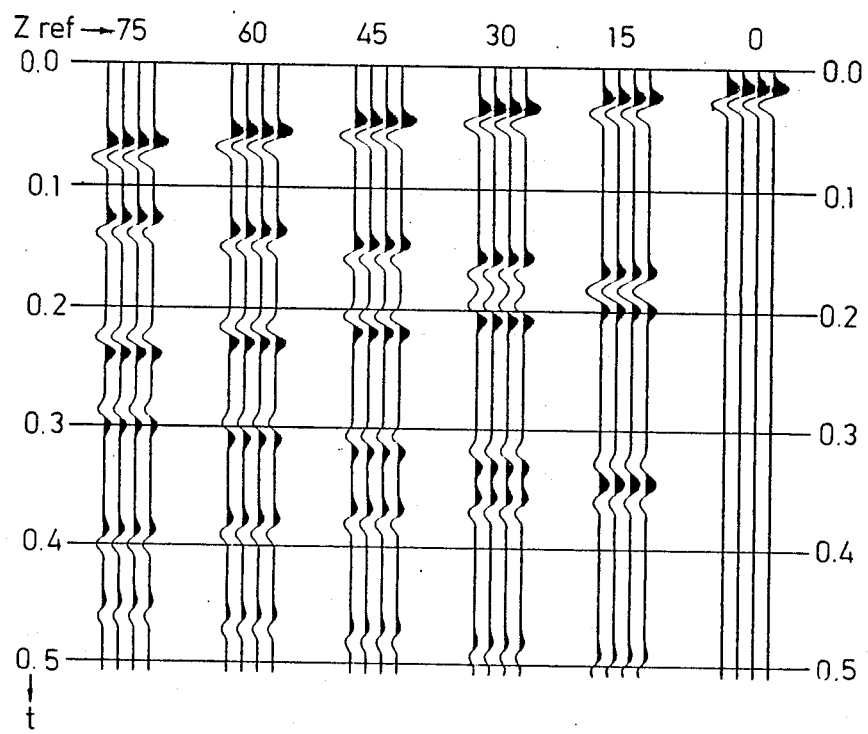
Figure 21:
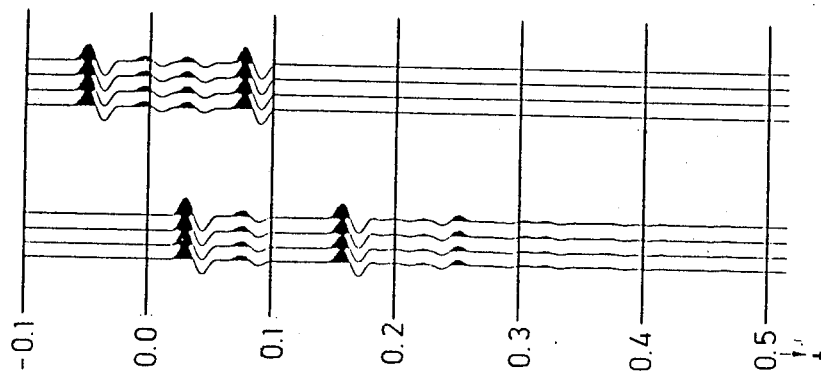
Figure 20:
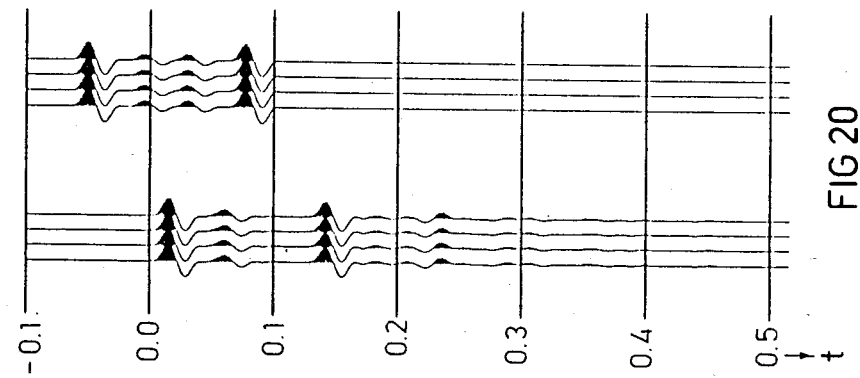
Figure 19:
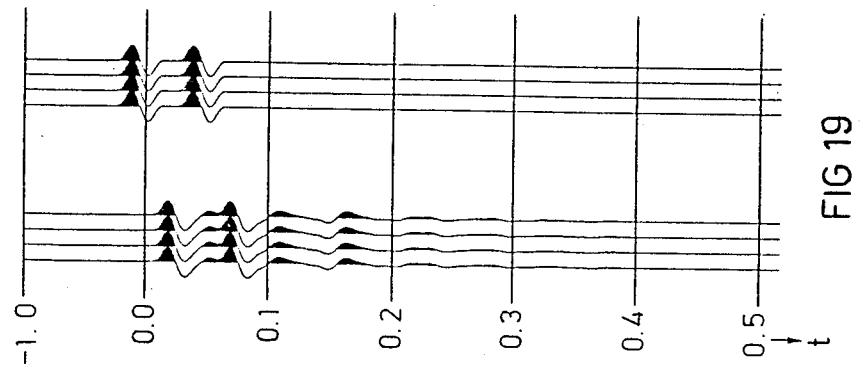

FIGS. 5 and 6 illustrate a more specific implementation of the invention with respect to a marine application, and follows the above-described model Case III wherein the source need not be at the surface.

Thus, as shown in FIG. 5, a ship 100 is used for towing the source 101 at a predetermined depth as determined by depth sensor 102. Ship 100 also tows a marine streamer 103 having the receivers, in the form of alternating velocity phones ($V_1$, $V_2$, $V_3$—) for sensing velocity, and hydrophones ($P_1$, $P_2$, $P_3$—) for sensing pressure, distributed along the length of the streamer at a predetermined depth as determined by depth sensor 104. While streamer cable 103 can be towed at any depth, greater mechanical stability can be achieved by towing at depths that are deeper than those commonly used today.

Each receiver ($V_1$, $P_1$—) records separately in order for the deconvolusion to be carried out in processing, the recordings being multiplexed by multiplexer 105.

FIG. 6 illustrates the system for processing the multiplexed information in a manner similar to that described above with respect to FIG. 1 for removing the effect of the source wavelet.

Thus, as shown in FIG. 6, the pressure information is demultiplexed at 106, corrected for spherical divergence at 107, and transformed from the time domain to the filter domain at 108. Similarly, the velocity information is demultiplexed at 110, corrected for spherical divergence at 111, and converted from the time domain to the frequency domain at 112. The "modified admittance" function in the frequency domain is then computed in block 115, by dividing the velocity field in the frequency domain outputted by block 112, by the pressure field in the frequency domain outputted by block 108. However, in this case, instead of directly converting the modified admittance function to the time domain, as described above with respect to FIG. 1, the deconvolved reflection series is first computed in accordance with Equation 37 described below, this being done in block 116, before the retransformation on the time field is effected in block 117.

Thus, in the present model of planes waves vertically incident on a horizontally layered earth, the equation describing the admittance is given by Equation (32) above, namely:

$$A_m = \frac{\sqrt{Z^{-n}} + (R(Z) - \sqrt{Z^n})(\alpha + Z^{-m})}{\sqrt{Z^{-n}} + (R(Z) - \sqrt{Z^n})(\alpha - Z^{-m})} \quad (36)$$

and hence $$R(Z) = \frac{\sqrt{Z^n}[(\alpha - Z^{-n})(1 - A_m) + Z^{-m}(1 + A_m)]}{\alpha(1 - A_m) + Z^{-m}(1 + A_m)} \quad (37)$$

which is the required deconvolved reflection series. To evaluate eqn (37) from the data, both the measured pressure and velocity fields are corrected for spherical divergence and then eqn (37) is expressed in the frequency domain; the responses of the phones and instruments may also be filtered out at this stage. To minimize noise problems, certain precautions should be taken in the processing. In general $\Lambda_m$ will have both poles and zeros. Using eqn (37) at the zeros $$[R(Z)]_{A_m=0} = \frac{\sqrt{Z^n}[\alpha - Z^{-n} + Z^{-m}]}{\alpha + Z^{-m}} \quad (38)$$

while at the poles $$[R(Z)]_{A_m=\infty} = \frac{\sqrt{Z^n}[Z^{-n} - \alpha + Z^{-m}]}{Z^{-m} - \alpha} \quad (39)$$

Both eqns (38) and (39) are well-behaved functions. At the poles of $\Lambda_m$, which would occur at zeros of $\tilde{P}$ (for example, at ghost notches), numerical problems arise if true poles are allowed. It would thus seem necessary to add some white noise to the pressure to prevent this from occurring. Similarly, at the zeros of $\Lambda_m$, which correspond to zeros of $V$ and can also be caused by ghosting, the resulting reflection series will contain no energy and these portions of its spectrum will consist of noise only. Both these problems can be overcome by multiplying eqn (37) by P throughout to give a new, semantically different, estimate of the reflection series:

$$R(Z) = \frac{\sqrt{Z^n}[(\alpha - Z^{-n})(YP - V) + Z^{-m}(YP + V)]}{\alpha(YP - V) + Z^{-m}(YP + V)}. \quad (40)$$

Note that this new expression for R(Z) is still source-independent and can be obtained using $\tilde{P}$ and $\tilde{V}$. Since the ghost notches of $\tilde{V}$ and $\tilde{P}$ are different in general, then the estimate of R(Z) obtained from eqn (40) will have no gaps in its spectrum; this estimate is thus well behaved and contains no poles. The resulting estimate of the reflection series will then have all ghosting effects due to the receiver depth removed. This aspect of the admittance deconvolution method is an advantage of the method over other forms of deconvolution involving single measurements where deghosting with good signal to noise ratio is difficult to achieve. Once R(Z) has been obtained it can be transformed back into the time domain to obtain the final result. It should be noted that the reflection series obtained has all surface multiples removed.

The procedure described above may be repeated for all pairs of hydrophones and velocity phones at all offsets and for all shots, with suitable adjustments made to the spherical spreading treatment and to the timing of events for offset-dependent changes in the ghosting. The resulting traces would then enter the usual processing sequence as deconvolved impulse responses. As an alternative to this procedure, it would be possible to derive an estimate of the wavelet for each shot from a single hydrophone-velocity phone pair close to zero offset and use the derived wavelet for standard signature deconvolution. This latter method is perhaps particularly attractive because it involves a minimum of computation and does not suffer from the problems inherent in stretching the technique to larger offsets. On the other hand, it would not enable full deghosting to be achieved for all offsets. Perhaps a more justified approach would be to use a plane-wave decomposition method to extract the normal-incident plane-wave components of the wavefield and then process these data using eqn (40) directly.

Our general procedure for combined pressure and velocity field measurements can be readily extended to the approach based on measurement of pressure at two different depths. There, although it would be ideal to tow two cables, it is more practical to tow a short streamer or single hydrophone at a different depth. The data thus acquired would then be processed in an analogous manner, but using eqn (30) to generate the appropriate expressions for $\Phi$ and R(Z). Again, since the ghost notches will be at different frequencies for different depths, both a deghosted wavelet and deconvolved trace can be derived.

In FIG. 5a, the pairs of receivers are illustrated as each including pressure sensor and a particle-velocity sensor ($V_1$, $P_1$; $V_2$, $P_2$; $V_3$, $P_3$) both located at the same depth below the point of application of the acoustic energy to the body for producing the pressure field and pressure gradient fields. The same result can be produced by using two pressure sensors located at two different depths below the point of application of acoustic energy to the body, as shown at $P_1$, $P_1'$; $P_2$, $P_2'$; $P_3$, $P_3'$, carried by streamers 104, 104' in FIG. 5b; or by using two particle-velocity sensors located at two different depths below the point of application of acoustic energy to the body, as shown at $V_1$, $V_1'$; $V_2$, $V_2'$; $V_3$, $V_3'$, carried by streamers 104, 104' in FIG. 5c.

The Second Embodiment (FIGS. 7a-14)

In this embodiment, the sensed pressure field and pressure gradient field are utilized for estimating the source wavelet by shifting the up-going fields upwardly to the free surface of the body, and shifting the down-going fields also upwardly to the free surface of the body, to thereby deconvolve the sensed response and to produce deghosted and spiked seismic data. This embodiment is described below particulary with reference to FIGS. 7a-14.

BASIC PRINCIPLES

The acoustic wave equation is a linear, second order partial differential equation. It therefore has associated with it two independent solutions, or fields, which are continuous both in space and time. The fields associated with the acoustic wave equation are pressure P and particle velocity W. In general the velocity field is a vector, however, we will be interested in the vertical component which is the only component of importance for one dimensional problems.

In order to investigate these two fields and how they are related let us derive the equation which both of them satisfy.

The pressure P and velocity W are related to each other by two basic equations. The first one is Newton's law:

$$\rho \frac{\partial W}{\partial t} = -\frac{\partial P}{\partial z}. \tag{1}$$

The second relation is Hooke's law $$\frac{\partial P}{\partial t} = -k \frac{\partial W}{\partial z}. \tag{2}$$

Here $\rho$ is the density and k is the bulk modulus of the medium.

Note that here we use a time derivative version of the basic Hooke's law.

Taking the derivative of the first equation with respect to z and the time derivative of the second equation we have $$\frac{\partial^2 W}{\partial z \partial t} = \frac{\partial}{\partial z}\left(\frac{1}{\rho} \frac{\partial P}{\partial z}\right) = \frac{1}{k} \frac{\partial^2 P}{\partial t^2} \tag{3}$$

and for constant $\rho$ we get the usual wave equation for the pressure P $$\frac{\partial^2 P}{\partial z^2} = \frac{1}{c^2} \frac{\partial^2 P}{\partial t^2} \tag{4}$$

$$\text{where } c = \sqrt{\frac{k}{\rho}}. \tag{5}$$

Here c is the acoustic velocity of the medium. In a similar way if we take the derivative of time in the first equation and equate it with the second equation's derivative with respect to depth we obtain:

$$\frac{\partial^2 P}{\partial z \partial t} = \rho \frac{\partial^2 W}{\partial t^2} = \frac{\partial}{\partial z}\left(k \frac{\partial W}{\partial z}\right) \tag{6}$$

and for constant k we obtain that W satisfies the wave equation:

$$\frac{\partial^2 W}{\partial z^2} = \frac{1}{c^2} \frac{\partial^2 W}{\partial t^2}. \tag{7}$$

In case of horizontal layers we have at the interfaces of the layers reflection and transmission coefficients which guarantee that both the pressure field as well as the particle velocity field will be continuous in space and time. From Newton's and Hooke's laws it is easily seen that a wavelet WA(t) that is associated with the pressure field is the same wavelet that is associated with the particle velocity field.

In our method of source wavelet deconvolution we exploit the fact that the wavelet convolved with the pressure field is the same as that convolved with the particle velocity.

Going from time to frequency domain we define a modified impedance function I(w) as $$I(\omega) = I_o^{-1} \frac{P(\omega)}{W(\omega)}. \tag{8}$$

Here $\omega$ is temporal frequency and $I_o$ is the local impedance of the medium in which the measurements are made, and P and W are the responses of the earth in the frequency domain. Note that $I(\omega)$ is a source independent quantity since by equation (8) any source spectrum convolved with velocity and pressure fields cancels out. The modified impedance function should not be confused with the local impedance of the medium which is simply $\rho c$.

To use our approach as means of deconvolution one needs to return from the impedance function to the deconvolved pressure and velocity fields. We will show how in simple situations such as the one dimensional model, this goal can be achieved.

SEPARATION INTO UP AND DOWNGOING FIELDS

We are dealing here with a one dimensional model. Until now we have shown that both the pressure field and particle velocity field satisfy the wave equation in homogeneous regions. We need to satisfy interface conditions as well in order to obtain a complete solution. As this stage it is advantageous to introduce a separation of fields into up and downgoing parts. The most general solution of the one dimensional wave equation is $$P = P + f(z - ct) + P - f(z + ct) = D + U, \tag{9}$$

Where D is the downgoing wave and U is the upcoming wave. From Newton's law [equation (1)] and equation (9) one finds $$\frac{\partial W}{\partial t} = -\frac{1}{\rho} P + f(z - ct) - \frac{1}{\rho} P - f(z + ct), \tag{10}$$

where the f' denotes the total derivative of f with respect to its argument.

Integrating equation (10) with respect to time and ignoring non physical constants one gets $$W = \frac{1}{\rho c} P^+ f(z - ct) - \frac{1}{\rho c} P^- f(z + ct) = \frac{1}{\rho c} [D - U]. \quad (11)$$

If there would have been only a downgoing wave in an infinite homogeneous medium the ratio of pressure to particle velocity would be the local impedance $\rho c$.

In a case downgoing wave is hitting an interface, there would be reflection and transmission through this interface so that both pressure and particle velocity field would be continuous.

Referring to FIG. 1a, r denotes a reflection coefficient such that $$U = rD. \quad (12)$$

The transmission coefficient has to be $1+r$ so that the pressure fields from both sides of the interface equate $$P_1 = D + rD = P_2 \quad (13)$$

where the indexes 1 and 2 denote the lower and upper media respectively. Equating the particle velocity fields from both sides and using equations (11) and (12) we obtain:

$$W_1 = \frac{D - rD}{\rho_1 c_1} = \frac{(1 + r)D}{\rho_2 c_2} = W_2. \quad (14)$$

Thus rearranging terms and deleting D we have $$\frac{1 - r}{1 + r} = \frac{\rho_1 c_1}{\rho_2 c_2} \quad (15)$$

or $$r = \frac{\rho_2 c_2 - \rho_1 c_1}{\rho_2 c_2 + \rho_1 c_1}. \quad (16)$$

For an upcoming wave hitting a reflector (FIG. 2b) one finds that the reflection coefficient from below the interface changes sign with respect to the previous situation. Note that defining pressure to be downgoing plus upcoming fields as given in equation (9) is an arbitrary choice. Should we chose it as $D-U$ then the particle velocity will appear with $D+U$. In that case we would obtain a reflection coefficient which is negative in sign to that of equation (16).

SOURCE AND RECEIVER AT THE SURFACE

The one dimensional model that we will treat first is a horizontally stratified medium with a vertically incident plane-wave source. We will further assume that the source and receiver are located at the earth's surface and that we measure both pressure P and particle velocity W fields.

We will use the equal travel time discretization of the model, i.e., that all the layers have equal travel time. This will allow us to express the fields by the Z transform expansion (Claerbout, 1976).

For a constant travel time $\tau$, the two way travel delay operator is given by $$Z = e^{2i\omega\tau}. \quad (17)$$

The model configuration is given by FIG. 2. Note that here we deal with receiver at the surface and thus $m=0$. The source is assumed to be a unit impulse spike and the reflections arriving from deeper layers are denoted by R(Z). These reflections are reflected back into the earth by the free surface with an opposite polarity.

Thus, the downgoing wave is given in this case by $$D = 1 + R(Z) \quad (18)$$

while the upcoming wave is given by $$U = R(Z) \quad (19)$$

According to equations (3) and (11) the pressure and particle velocity fields are given by $$P = 1 + R(Z) - R(Z) = 1 \quad (20)$$

and $$W = \frac{1}{\rho c}(1 + 2R(Z)). \quad (21)$$

Thus the pressure field measures only the spike due to the source, while the particle velocity field measures the spike plus twice the reflection series.

The modified impedance is given according to equations (8), (9), and (11) by $$I(\omega) = \frac{D + U}{D - U} = \frac{1}{1 + 2R(Z)}. \quad (22)$$

The modified admittance $Y(\omega)$, which is the inverse of the modified impedance, measures thus the impulse response of the particle velocity field $$Y(\omega) = \rho_c \frac{W(\omega)}{P(\omega)} = \frac{D - U}{D + U} = 1 + 2R(Z). \quad (23)$$

In case when the source is not a unit spike but has some wavelet WA(z) associated with it, the pressure P and particle velocity W will be convolved with WA(z). According to equation (20) P will measure then directly the wavelet WA, and the modified admittance will still yield the impulse response of the particle velocity. We see from equation (23) that the deconvolution of the particle velocity is done, as usual, by spectral division of $W(\omega)$ by the source wavelet given by $P(\omega)$.

RECEIVER AT DEPTH IN HOMOGENEOUS LAYER

We have here a similar configuration as the previous case, with the exception that now we require the receiver to be deep inside a homogeneous layer, namely water (FIG. 2). Thus we assume that $r_0 = -1$, $r_1 = r_2 = r_{m-1} = 0$, $r_m = \leq 0$.

The pressure $P_m$ and particle velocity $W_m$, measured at layer m are given by $$P_m = D_m + U_m \quad (24)$$

and $$W_m = \frac{1}{\rho_o c_o}[D_m - U_m]. \quad (25)$$

By applying the delay operator Z [equation (17)] we can rewrite these quantities by the downgoing and upgoing waves at the free surface, denoted by $D_o$, $U_o$ respectively:

$$P_m = \sqrt{Z^m} [D_o + Z^{-m} U_o] \qquad (26)$$

and $$W_m = \frac{1}{\rho_o c_o} \sqrt{Z^m} [D_o - Z^{-m} U_o]. \qquad (27)$$

Inserting relations (18) and (19) we find for a spiked source;

$$P_m = \sqrt{Z^m} [1 + R(Z)(1 - Z^{-m})] \qquad (28)$$

and $$W_m = \frac{1}{\rho_o c_o} \sqrt{Z^m} [1 + R(Z)(1 + Z^{-m})]. \qquad (29)$$

The measured impedance will be:

$$I_m(\omega) = \frac{1 + R(Z)[1 - Z^{-m}]}{1 + R(Z)[1 + Z^{-m}]}. \qquad (30)$$

Note that unlike the previous case the impedance (or the admittance) does not give us a deconvolved field. However, the impedance as computed by equation (18) and using equation (30) will give us R(Z) and from it we can compute the deconvolved version of pressure and particle velocity.

Solving for R(Z) in equation (30) we find:

$$R(Z) = \frac{1 - I_m}{I_m(1 + Z^{-m}) - (1 - Z^{-m})}. \qquad (31)$$

In order to see how to estimate the wavelet in this case let us define first for clarity the convolved fields of P and W as $\widetilde{P}$ and $\widetilde{W}$ respectively:

$$\widetilde{P}_m = P_m(\omega) \cdot WA(\omega) \qquad (32)$$

and $$\widetilde{W}_m = W_m(\omega) \cdot WA(\omega). \qquad (33)$$

where $WA(\omega)$ is the common wavelet in the frequency domain. From equation (8) we thus have $$I_m(\omega) = \frac{1}{\rho_o c_o} \frac{\widetilde{P}_m(\omega)}{\widetilde{W}_m(\omega)} = \frac{1}{\rho_o c_o} \frac{P_m(\omega)}{W_m(\omega)}. \qquad (34)$$

Equation (31) is thus applicable also for any source wavelet $WA$.

Inserting the first of the above relations in equation (31) we obtain $$R(Z) = \frac{\rho_o c_o \widetilde{W}_m - \widetilde{P}_m}{\widetilde{P}_m(1 + Z^{-m}) - \rho_o c_o \widetilde{W}_m(1 - Z^{-m})}. \qquad (35)$$

Then, using equation (28), one obtains $$P_m = \frac{2\widetilde{P}_m \sqrt{Z^{-m}}}{\widetilde{P}_m(1 + Z^{-m}) - \rho_o c_o \widetilde{W}_m(1 - Z^{-m})},$$

and through equation (32) one finally obtains $$WA(z) = \frac{\widetilde{P}_m}{P_m} = \qquad (36)$$

$$\frac{1}{2} \sqrt{\frac{m}{Z}} [\widetilde{P}_m(1 + Z^{-m}) - \rho_o c_o \widetilde{W}_m(1 - Z^{-m})].$$

An identical wavelet will result should we have used the particle velocity field of equation (33).

What we do in effect in equation (36) can be looked at as bringing the receiver back to the surface and measuring the pressure there. As we showed before, the pressure field in this case constitutes the actual wavelet of the source.

In order to demonstrate this point let us construct the up and downgoing waves for the case $$U_m = \frac{1}{2}(\widetilde{P}_m - \rho_o c_o \widetilde{w}_m) \qquad (37)$$

and $$D_m = \frac{1}{2}(\widetilde{P}_m + \rho_o c_o \widetilde{W}_m). \qquad (38)$$

These waves can now be separately extrapolated back to the free surface by applying simple forward and backward shifting:

$$U_o = \frac{Z^m}{2} [\widetilde{P}_m - \rho_o c_o \widetilde{W}_m] \qquad (39)$$

and $$D_o = \frac{Z^{-m}}{2} [\widetilde{P}_m + \rho_o c_o \widetilde{W}_m].$$

Adding the up and downgoing components we obtain the pressure at the surface:

$$P_o = U_o + D_o = \qquad (40)$$

$$\frac{1}{2} \sqrt{\frac{m}{Z}} [\widetilde{P}_m (1 + Z^{-m}) - \rho_o c_o \widetilde{W}_m (1 - Z^{-m})].$$

Equation (40) is identical to equation (36) which demonstrates that one can view the problem of wave estimation as extrapolating the waves back to the free surface.

SOURCES AT DEPTH

When a source is placed at depth rather than at the surface, additional upgoing and downgoing waves are introduced through the process known as ghosting.

We limit ourselves to the situation in which the receivers are always below the source and both of them are located in a homogeneous medium (water). We assume the source to be at layer n and the receiver at layer m where m>n. In this case the source appears as two spikes originating at the surface, the first appears at time $-n\tau$ and the second, which is a ghost appears with opposite polarity at time $n\tau$. Thus the results we obtained before for a source acting at the surface remain valid also for a buried source except that the source wavelet will include here a ghost.

NUMERICAL RESULTS

We have tested the ideas expressed in this work by observing how synthetic seismograms behave with regards to the proposed methods of wavelet estimation and deconvolution.

An effective way for creating one dimensional synthetic seismogram was given by Wyatt (1981). The work of Wyatt deals with Vertical Seismic Profiles but it is also a powerful way to obtain a synthetic seismogram for any source-receiver configuration.

FIGS. 9a and 9b show the total time-depth history of both pressure field (FIG. 9a) and particle velocity field (FIG. 9b) for a case or a single layer above a half space with source located at the surface. The non-vanishing reflector is $r(15) = -0.3$.

In FIG. 10a shows the pressure field for the same model as before at a receiver placed just above the reflector at layer LR = 13. FIG. 10b describes the particle velocity field at this receiver. These were the raw data used for the estimation of the wavelet (FIG. 10g) using equation (36) and the reflectivity of the model (FIG. 10h) using equation (35). FIGS. 10c and 10d show the upcoming and downgoing waves given by equations (37) and (38) respectively.

FIG. 10e is the pressure field as measured at the free surface. Note that it is identical to the estimated wavelet given in FIG. 10g since the only pressure recorded at the free surface is the source itself.

FIG. 10f represents the particle velocity at the free surface. It is similar to the reflectivity given in FIG. 10h and obtained by equation (35), apart from a constant of 0.5, a missing first arrival in FIG. 10h which appears in FIG. 10f, and the deconvolved nature of FIG. 10h.

In FIGS. 11a and 10b we take the same model as that of FIGS. 9a, 9b and 10 but this time we place the source at depth of 5 equal travel time layers (LS = 5). The single reflector is as before at the 15th layer interface.

The pressure and particle velocity fields are depicted in FIGS. 11a and 11b. FIG. 12 shows P and W (FIGS. 12a and 12b) at a receiver placed at the $13^{th}$ interface (LR = 13). FIGS. 12c and 12d show the upcoming and downgoing waves observed at that receiver. FIG. 12e is the estimated wavelet which contains in this case that ghost with an opposite polarity. FIG. 12f shows the estimated reflectivity. The wavelet in the experiments reported until now is a Ricker type wavelet having a duration of 5 time steps. Note that the reflectivity has associated with it some noise. This is due to the band limitness of the wavelet.

FIGS. 13a and 13b describe a more complicated model. The non-vanishing reflection coefficients are given as $r(15) = -0.3$, $r(30) = -0.25$,
$r(25) = 0.2$, $r(40) = 0.15$,
$r(28) = -0.333$, $r(70) = -0.333$, The velocities are assumed to be constant in the whole medium so the reflectors occur due to a change in density.

FIGS. 13a and 13b show the P and W fields of this model for a source located at the 5th interface (LS = 5). FIGS. 14a–14f describe pressure (FIG. 14a) and particle velocity (FIGS. 14b) for a receiver located at the $13^{th}$ interface (LR = 13). FIGS. 14c and 14d describe the downgoing and upcoming waves at this receiver. FIG. 14e gives the estimated wavelet which is also ghosted. Here the wavelet is much wider and contains 30 points. FIG. 14f is the reflectivity estimation. We suspect that due to lack of wide enough band in the wavelet spectrum the reflectivity estimate fails to indicate the true reflectivity.

The Third Embodiment (FIGS. 15-21)

In the third embodiment, the sensed pressure field and pressure gradient field are utilized for estimating the source wavelet by extrapolating the pressure field to the free surface of the body to thereby deconvolve the detected response to produce deghosted and spiked seismic traces. This embodiment will be better understood by reference to FIGS. 15-21 and the following mathematical analysis:

PRINCIPLES OF THE METHOD

The principle of wavelet estimation by upward extrapolation is briefly described below.

Consider the equation defining the pressure field in an acoustic model:

$$\frac{1}{\rho v^2} \frac{\partial^2 P}{\partial t^2} = \frac{\partial}{\partial z}\left(\frac{1}{\rho} \frac{\partial P}{\partial z}\right), \tag{1}$$

where
$\rho = \rho(Z)$ is density,
$v = v(Z)$ is velocity,
$P = P(Z,t)$ is pressure.

and assume that a pressure source f(t) starts to operate at time 0 at the free surface. Specifying the pressure field at two depth levels, $z_r$ and $z_r + \Delta z$ and using the finite-differences approximation to equation (1) with the spatial sampling interval $\Delta z$, we can extrapolate the pressure field upward to the free surface. In the finite-differences scheme we interchange the roles of depth and time: instead of the usual time marching scheme, we use a depth marching scheme. Since the pressure field vanishes at the free surface, we obtain as a result of the extrapolation, the source wavelet f(t).

ACOUSTIC MODEL

In order to illustrate the process of upward extrapolation, let us consider a one-layer acoustic model (FIG. 1a). In the first case, a source of pressure operates at the free surface and a pair of receivers is located at depth levels of 75 and 76.5 m. FIG. 1b shows the pressure field recorded by the first receiver ($z_{ref} = 75$) and the results of upward extrapolation of this field to a number of reference levels, including the free surface ($z_{ref} = 0$). We can see that the pressure field at $z_{ref} = 75$ consists of the following sequence of events (the sign in brackets designates the polarity of the arrival):

| | | |
|---|---|---|
| Direct wave (+) | downgoing | |
| 1st reflection from the interface (+) | upgoing | ⎫ group 1 |
| Reflection from the free surface (−) | downgoing | ⎭ |
| 2nd reflection from the interface (−) | upgoing | ⎫ group 2 |
| Reflection from the free surface (+) | downgoing | ⎭ |
| and so on . . . | | |

This sequence can be subdivided into groups of up and downgoing events having the same order of reflection from the interface. We can see that the events within each group have opposite polarity.

The upward extrapolation should recover the time history of pressure at the depth levels above the receiver. It is obvious that the downgoing events arrive at these levels at earlier times than at the receiver, whereas the upgoing events arrive later. Thus, upward extrapolation should shift the downgoing events up and the upgoing events down in time. This is clearly demonstrated in FIG. 1b; we can see that as we proceed upward in depth, the events within each group are drawn nearer in time. As the depth level of extrapolation approaches zero (the free surface), the time difference between the arrivals also approaches zero; since the events arrive in opposite polarity, they cancel each other out at the free surface. On the other hand, since the direct wave does not have an upgoing counterpart, it is just shifted toward zero time. Thus, the above example shows that, in the case of a surface source, the upward extrapolation to the free surface yields the source wavelet.

Consider now the case of a buried source operating in the same acoustic model (FIG. 1a). In this case the source wavelet also includes a ghost resulting from the reflection of the direct wave from the free surface. The source depth is 30 m; a pair of receivers is located at the same depth levels as in the previous example. FIG. 2 shows the pressure field recorded at a depth level of 75 m and the results of upward extrapolation of this field. In this case the recorded field consists of two sequences of events: the first being the same as described in the previous example and the second sequence including ghost events. Thus each event in the first sequence has its ghost counterpart in the second sequence; it has the reverse polarity and is shifted in time by $\delta\tau = 2z_s/v_o$, where $z_s$ is the source depth and $v_o$ is the velocity in the layer.

In order to explain the process of upward extrapolation in this case, let us consider the analytical expression for the pressure field. For this purpose we define the number of time samples, m, n and N, corresponding to the depths of the source ($z_s$), receiver ($z_r$) and interface ($z_{int}$):

$$m\Delta\tau = Z_s/v_o,$$
$$n\Delta\tau = Z_r/v_o, \quad (2)$$
$$N\Delta\tau = Z_{int}/v_o,$$

where $\Delta\tau$ is the time sampling interval. Next, we designate the reflection coefficient from the halfspace as r. Taking into account that the reflection coefficient from below the free surface equals −1 and using Z-transform (where Z is the unit-delay operator, $z = e^{-i\omega\Delta\tau}$), we can describe the pressure field as follows:

$$P(Z) = F(Z)(Z^{-m} - Z^m)(Z^n + rZ^{2N-n}) \sum_{K=\infty}^{\infty} (-rZ^{2N})^K \quad (3)$$
$$= F(Z)(Z^{-m} - Z^m)(Z^n + rZ^{2N-n})/(1 + rZ^{2N}),$$

where F(Z) is the source function.

At this stage we introduce an important concept which helps us to clearly understand the results of the upward extrapolation. Let us define a Fictitious Surface Source (FSS) operating at the free surface such that it would produce the same pressure field below the level $z_s$ as the actual source. Designating FSS as $P_o(z)$, it can be easily seen that its field can be expressed as follows for the above models:

$$P_{FSS}(Z) = P_o(Z)(Z^n + rZ^{2N-n})/(1 + rZ^{2N}) \quad (4)$$

Comparing expressions (3) and (4) and using the definition of the FSS, we will obtain the following expressions for the FSS:

$$P_o(Z) = F(Z)(Z^{-m} - Z^m) = F(Z)Z^{-m}(1 - Z^{2m}) \quad (5)$$

This expression shows that, in our case, the FSS consists of a direct wave and its ghost, both shifted back in time by m samples.

Going back to expression (3), we can see that the first member within the second brackets ($Z^n$) is related to downgoing waves, whereas the second member ($rZ^{2N-n}$) is related to upgoing waves. Since the upward extrapolation to the free surface will shift the downgoing waves back in time by n samples and the upgoing waves forward by n samples, we can then describe the process of extrapolation by multiplying the first member by $Z^{-n}$ and the second by $Z^n$. As a result, we obtain from expression (3) for the extrapolated field:

$$P(Z) = F(Z)(Z^{-m} - Z^m) = P_o(Z) \quad (6)$$

Thus, the upward extrapolation to the free surface gives the FSS; this is clearly demonstrated in FIG. 2. We see that the only downgoing waves which do not have upgoing counterparts and, therefore, are not cancelled at the free surface, are the direct wave and its ghost; the extrapolation merely shifts them towards negative times.

ELASTIC MODEL

Now let us consider a one-dimensional elastic model. The difference with the acoustics in this case is that we measure displacements rather than pressure. Since the displacement field does not vanish at the free surface, the upward extrapolation of this field will not produce the source wavelet. However, on the basis of this field we are able to calculate the stress field which vanishes at the free surface; then, using the relations between the two fields, we can estimate the source wavelet. Let us consider this in more detail.

In a one-dimensional case the relations between the displacement and stress fields are as follows:

$$\sigma = \rho v^2 \frac{\partial u}{\partial z}, \quad (7)$$

$$\rho \frac{\partial^2 u}{\partial t^2} = \frac{\partial \sigma}{\partial z}, \quad (8)$$

where $\partial = \partial(z,\tau)$ is the vertical normal component of stress, and $u = u(z,\tau)$ is the vertical component of displacement.

Using these relations, we obtain the equation for displacement:

$$\rho \frac{\partial^2 u}{\partial t^2} = \frac{\partial}{\partial z}\left(\rho v^2 \frac{\partial u}{\partial z}\right). \quad (9)$$

The process of FSS estimation can be described as follows:

1. Specification of the displacement u at two depth levels, $z_r$ and $z_r + \Delta z$.
2. Upward extrapolation of u to the free surface using the finite-differences approximation to equation (9).
3. Computation of $\partial(z=0)$ using expression (7). It can be shown that $-\partial(z=0)$ corresponds to the time derivative of the FSS for the displacement field.
4. Time integration of $-\partial(z=0)$.

Consider a number of examples illustrating the results of the above process. FIG. 3a shows a multi-layered elastic model. In the first example, a source and a pair of receivers are located within the upper layer; the source depth is 25 m and the depths of receivers are 30 m and 31 m. The left hand part of FIG. 3b shows the displacement field recorded by the first receiver, the right hand part of the figure shows the estimated FSS. As may be expected in this case, the FSS includes a direct wave and its ghost shifted to negative times; since, for displacement, the reflection coefficient below the free surface equals 1, the ghost appears with the same polarity as the direct wave.

The next example was computed for the same model (FIG. 3a) but with the source and receivers located within the second layer $z_s = 75$ m; $z_r = 78$ m and 79 m); FIG. 4 shows the displacement field (left) and the FSS (right) for this case. In order to explain the structure of the FSS, let us consider the analytical expression for the displacement field in a halfspace below a layer. Designating the reflection coefficient from the above interface as r and assuming that the thickness of the layer corresponds to time samples and that the depths of the source and receiver correspond to $N+m$ and $N+n$ time samples respectively, we can write the displacement field at the receiver as:

$$u(Z) = F(Z)\left[Z^{n-m} - rZ^{n+m} + (1-r^2)Z^{2N+n-m}\sum_{K=0}^{\infty}(rZ^{2N})^K\right] \quad (10)$$

$$= F(Z)[Z^{n-m} - rZ^{n+m} + (1-r^2)Z^{2N+n-m}/(1-rZ^{2N})].$$

Designating the FSS as $U_o(Z)$, we can write the expression for its field as follows:

$$u_{FSS}(Z) = v_o(Z)(1+r)Z^{N+n}/(1-rZ^{2N}) \quad (11)$$

Equating $U(Z)$ and $U_{FSS}(Z)$, we obtain for the FSS:

$$U_o(Z) = \frac{F(Z)}{1+r}[Z^{-(N+m)} - rZ^{m-N} + Z^{N+m} - rZ^{N-m}] \quad (12)$$

$$= \frac{F(Z)}{1+r}[Z^{-(N+m)}(1-rZ^{2m}) + Z^{N+m}(1-rZ^{-2m})].$$

Thus, the FSS in this case consists of four events which can be divided into two groups. The first group includes a direct wave and its reflection from the interface, both shifted back in time by $N+m$. The events of the second group are the mirror images (relative to the free surface) of the events of the first group; they appear at times that are inverse to those of the first two events. FIG. 4, right, clearly illustrates this structure of the FSS.

The last example (FIG. 5) shows the displacement field and the estimated FSS for the same model (FIG. 3a) with the following source-receiver geometry: $z_s = 75$ m and $z_r = 105$ and 106 m. We can see that in this case we obtain the same FSS as previously (FIG. 4). This is quite clear because, as we have seen, the FSS depends only on the parameters of the model above the source and does not "feel" deeper parts of the model.

CONCLUSIONS

A method of deterministic estimation of the source wavelet for marine and land data has been proposed. It is based on upward extrapolation of the wave field to the free surface and on the use of the concept of Fictitious Surface Source. The method is illustrated by a number of synthetic examples which show that it gives a good estimate of the source wavelet for arbitrary locations of the source and receiver in one-dimensional multi-layered models, provided that the source is above the receiver. The wavelet estimated by the method can be used for source signature deconvolution and deghosting of seismic data.

What is claimed is:

1. The method of seismic extrapolation of a body by applying to the body acoustic energy producing a source wavelet and detecting the response of said body thereto to produce siesmic traces; characterized in:
   (a) locating at least two receivers within the body below its free surface to output electrical signals representing upgoing fields moving upwardly to the free surface, and downgoing fields moving downwardly from the free surface, which electrical signals correspond to (1) the pressure field produced at a particular depth in the body as a result of the application of said acoustic energy, and (2) the particle velocity produced at said depth in the body as a result of the application of said acoustic energy;
   (b) recording said electrical signals;
   (c) processing said recorded electrical signals to estimate the source wavelet with its full bandwidth spectrum;
   (d) and using said source wavelet with its full bandwidth spectrum to deconvolve the detected response producing deghosted and spiked seismic traces.

2. The method according to claim 1, wherein said two receivers are pressure sensors located at two different depths below the point of application of the acoustic energy to the body.

3. The method according to claim 1, wherein said two receivers are particle-velocity sensors located at two different depths below the point of application of acoustic energy to the body.

4. The method according to claim 1, wherein said two receivers are a pressure sensor and a particle-velocity sensor both located at the same depth below the point of the application of acoustic energy to the body.

5. The method according to claim 1, wherein said sensed pressure field and pressure gradient field are utilized for estimating the source wavelet and for deconvolving the detected response to produce deghosted and spiked seismic traces, by:
   (a) sensing said pressure field and pressure gradient field in the time domain;
   (b) transforming both said fields to the frequency domain;
   (c) dividing one of said frequency domain fields by the other to produce a modified function which is equal to the energy response of one of said fields in the frequency domain; and (d) retransforming said modified function back to the time domain to thereby deconvolve the detected response to produce deghosted and spiked seismic traces.

6. The method according to claim 5, wherein said two receivers are a pressure sensor and a particle-velocity sensor both located at the same depth below the point of application of the acoustic energy to the body; said receivers sensing both the pressure and particle-velocity fields in the time domain at equally spaced intervals.

7. The method according to claim 6, wherein the particle-velocity field in the frequency domain is divided by the pressure field in the frequency domain to produce the modified admittance function which is equal to the energy response of the particle-velocity filed in the frequency domain.

8. The method according to claim 5, wherein said body is water.

9. The method according to claim 1, wherein said sensed pressure field and pressure gradient field are utilized for estimating the source wavelet by shifting the recorded electrical signals representing the upgoing fields upwardly to the free surface of the body, and shifting the recorded electrical signals representing the downgoing fields also upwardly to the free surface of the body, to simulate a fictitious source at the free surface, and deconvolving the simulated fictitious source from the recorded electrical signal to produce deghosted and spiked seismic data.

10. The method according to claim 9, wherein said body is water.

11. The method according to claim 10, wherein said body is water.

12. The method according to claim 10, wherein said body is land.

* * * * *